US006987270B2

(12) United States Patent
Trotter

(10) Patent No.: US 6,987,270 B2
(45) Date of Patent: Jan. 17, 2006

(54) METHOD TO ACCOUNT FOR EVENT LOSSES DUE TO POSITRON RANGE IN POSITRON EMISSION TOMOGRAPHY AND ASSAY OF POSITRON-EMITTING ISOTOPES

(75) Inventor: Dinko Eduardo Gonzalez Trotter, Clifton Park, NY (US)

(73) Assignee: General Electric Company, Niskayuna, NY (US)

(*) Notice: Subject to any disclaimer, the term of this patent is extended or adjusted under 35 U.S.C. 154(b) by 258 days.

(21) Appl. No.: 10/430,430

(22) Filed: May 7, 2003

(65) Prior Publication Data

US 2004/0222381 A1 Nov. 11, 2004

(51) Int. Cl.
*G01T 1/64* (2006.01)
(52) U.S. Cl. .................. 250/395; 250/369; 250/363.03
(58) Field of Classification Search ................ 250/395, 250/369, 363.03
See application file for complete search history.

(56) References Cited

U.S. PATENT DOCUMENTS

| | | | |
|---|---|---|---|
| 5,143,713 A | | 9/1992 | Phillips et al. |
| 5,158,760 A | | 10/1992 | Phillips et al. |
| 5,210,423 A | * | 5/1993 | Arseneau .................. 250/369 |
| 5,310,539 A | | 5/1994 | Williams |
| 5,792,444 A | | 8/1998 | Fischman et al. |
| 5,792,742 A | | 8/1998 | Gold et al. |
| 5,881,178 A | * | 3/1999 | Tsykalov et al. ........... 382/260 |
| 6,019,957 A | | 2/2000 | Miller et al. |
| 6,024,938 A | | 2/2000 | Corbo et al. |
| 6,426,400 B1 | | 7/2002 | Zalutsky |
| 6,468,505 B1 | * | 10/2002 | Lang et al. .............. 424/9.321 |
| 2002/0025296 A1 | | 2/2002 | Knaus et al. |
| 2002/0098148 A1 | | 7/2002 | Miller et al. |
| 2002/0102264 A1 | | 8/2002 | Cheung |
| 2002/0115112 A1 | | 8/2002 | Yu et al. |
| 2002/0173626 A1 | | 11/2002 | Kundra |
| 2004/0225214 A1 | * | 11/2004 | Trotter et al. ............... 600/436 |

FOREIGN PATENT DOCUMENTS

| | | |
|---|---|---|
| EP | 0 532 718 B1 | 12/1999 |
| WO | WO 92/01068 A1 | 1/1992 |
| WO | WO 92/18166 A1 | 10/1992 |
| WO | WO 95/11045 A1 | 4/1995 |
| WO | WO 96/04304 A1 | 2/1996 |
| WO | WO 96/12508 A2 | 5/1996 |
| WO | WO 96/40295 A1 | 12/1996 |
| WO | WO 98/55153 A1 | 12/1998 |
| WO | WO 99/55367 A1 | 11/1999 |
| WO | WO 00/32240 A2 | 6/2000 |
| WO | WO 00/69914 A2 | 11/2000 |
| WO | WO 01/25410 A2 | 4/2001 |
| WO | WO 01/30398 A2 | 5/2001 |
| WO | WO 01/36003 A2 | 5/2001 |
| WO | WO 01/36486 A2 | 5/2001 |

(Continued)

OTHER PUBLICATIONS

Gregory P. Adams, "Improving the Tumor Specificity and Retention of Antibody-Based Molecules", in vivo 12: 11-22, (1998).

(Continued)

*Primary Examiner*—David Porta
*Assistant Examiner*—Christine Sung
(74) *Attorney, Agent, or Firm*—Jean K. Testa; Christian G. Cabou

(57) ABSTRACT

A method of quantitative positron emission analysis includes accounting for the loss of positron-electron annihilation events and quantitative inaccuracies in positron emission assays.

6 Claims, 7 Drawing Sheets

FOREIGN PATENT DOCUMENTS

| WO | WO 01/79442 A2 | 10/2001 |
| WO | WO 02/14369 A2 | 2/2002 |
| WO | WO 02/18620 A2 | 3/2002 |
| WO | WO 02/32375 A2 | 4/2002 |
| WO | WO 02/38612 A2 | 5/2002 |
| WO | WO 02/064747 A2 | 8/2002 |

OTHER PUBLICATIONS

Gregory P. Adamns et al., "Prolonged in vivo tumour retention of a human diabody targeting the extracellular domain of human HER2/neu", British Journal of Cancer (1996), 77 (9), pp. 1405-1412.

Pieter L. Jager et al., "Radiolabeled Amino Acids: Basic Aspects and Clinical Applications in Oncology", The Journal of Nuclear Medicine, vol. 42, No. 3, Mar. 2001.

Robert M. Kessler et al., Analysis of Emission Tomographic Scan Data: Limitations Imposed by Resolution and Background, Journal of computer Assisted Tomography, 8 (3): pp. 514-522, Jun. 1984.

Richard Laforest et al., "MicroPET Imaging With Nonconventional Isotopes", IEEE Transactions on Nuclear Science, vol. 49, No. 5, Oct. 2002.

Craig S. Levin et al., "Calculation of positron range and its effect on the fundamental limit of positron emission tomography system spatial resolution", Phys. Med. Biol. 44 (1999), pp. 781-799.

Anna Lövqvist et al., "PET Imaging of $^{86}$Y-Labeled Anti-Lewis Y Monoclonal Antibodies in a Nude Mouse Model: Comparison Between $^{86}$Y and $^{111}$In Radiolables", The Journal of Nuclear Medicine, vol. 42, No. 8, Aug. 2001, pp. 1281-1287.

Ulrik B. Nielsen et al., "Targeting of Bivalent Anti-ErbB2 Diabody Antibody Fragments to Tumor Cells Is Independent of the Intrinsic Antibody Affinity[1]", Cancer Research 60, pp. 6434-6440, Nov. 15, 2000.

Gabriela Pavlinkova et al., "Pharmacokinetics and Biodistribution of Engineered Single-Chain Antibody Constructs of Mab CC49 in colon Carcinoma Xenografts", The Journal of Nuclear Medicine, vol. 40, No. 9, Sep. 1999, pp. 1536-1546.

Keith S. Pentlow et al., "Quantitative imaging of I-124 using positron emission tomography with applications to radioimmunodiagnosis and radioimmunotherapy", Med. Phys. 18 (3), May/Jun. 1991, pp. 357-366.

Keith S. Pentlow et al., "Quantitative Imaging of Yttrium-86 with PET: The Occurrence and Correction of Anomalous Apparent Activity in High Density Regions", Clinical Positron Imaging, vol. 3, No. 3, pp. 85-90, (2000).

Timothy A.D. Smith et al., "Treatment of SW620 Cells with Tomudex and Oxaliplatin Induces Changes in 2-Deoxy-D-Glucose Incorporation Associated with Modifications in Glucose Transport", The Journal of Nuclear Medicine, vol. 41, No. 10, pp. 1753-1759, Oct. 2000.

Anna M. Wu et al., "High-resolution microPET imaging of carcino-embryonic antigen-positive xenografts by using a copper-64-labeled engineered antibody fragment", PNAS, Jul. 18, 2000, vol. 97, No. 15, pp. 8495-8500.

* cited by examiner

US 6,987,270 B2

METHOD TO ACCOUNT FOR EVENT LOSSES DUE TO POSITRON RANGE IN POSITRON EMISSION TOMOGRAPHY AND ASSAY OF POSITRON-EMITTING ISOTOPES

BACKGROUND OF THE INVENTION

The present invention relates generally to a PET (positron emission tomography) scanning technique and more specifically to a PET scanning technique that facilitates accurate quantitative determination of tracer material in small bodies/tissue/organ samples in a PET scanner or assayed using a counter/detector.

Positron emission tomography (PET) relies on the detection of the annihilation of positrons emitted from a radionuclide (e.g. F-18, I-124, Ga-68) with electrons present in the surrounding medium. Under normal circumstances the standard assumption is that activity distribution of interest is embedded in tissue of more-or-less homogeneous density (typically that of water). Positrons are emitted from the radionuclide with a certain spectrum of energies, which determine the distribution of distances that a positron may travel through surrounding medium before annihilating with an electron.

In some situations, however, the distribution radionuclide may be in close enough proximity to a medium of density significantly different from that of water (for example, air). In such cases, some positrons have a significant probability of reaching a lower density medium such as air, and hence their probability of annihilating in close proximity to their point of emission is drastically reduced. These positron which reach air can be considered as "lost" to measurement. This situation is possible for small amounts (on the order of a gram or less) of tissues whose activity (based on a PET radionuclide) is measured in test tubes, and for xenograft tumors embedded under the skin of animals. This effect has been observed for PET radionuclides with relatively high-energy positron-emission spectra, such as I-124. Therefore, a method of properly accounting for the loss of positron-electron annihilation events is necessary in order to improve the estimates of PET radionuclide activity and activity concentrations.

SUMMARY OF THE INVENTION

A first aspect of the invention resides in a method of quantitative positron emission analysis comprising accounting for the loss of positron-electron annihilation events and quantitative inaccuracies in positron emission assays.

A second aspect of the invention resides in a method of quantitative PET analysis comprising using a combination of empirical measurements and convolution kernels to calculate positron-electron annihilation event loss due to positron range.

A third aspect of the invention resides in a method of accounting for loss of positron-electron annihilation events and quantitative inaccuracies in PET (positron emission tomography) imaging, comprising modeling a distribution of positron-electron annihilation events by: convolving a first distribution of positron-emitting radionuclides using a first predetermined kernel to produced a second distribution result; masking the second distribution result with a three-dimensional map of a physical medium where the distribution of radionuclides is located so as to suppress or diminish the number of annihilation events from a low-density medium and producing a third distribution result; and convolving the third distribution result with a kernel representative of the measurement system to produce a fourth distribution result which takes into account the loss of positron-electron annihilation events.

BRIEF DESCRIPTION OF THE DRAWINGS

The various aspects and features of the invention will become more clearly appreciated from the following description taken with the appended drawings wherein.

DETAILED DESCRIPTION OF THE PREFERRED EMBODIMENTS

The embodiments of the invention are directed to quantitatively imaging PET radioisotope tracers. These radioisotopic tracers can be attached to a variety of elements such as ligands which include antibodies, peptides, small molecules, and the like.

While not specifically limited thereto, the embodiments of the invention find application in the quantitative PET determination of the absolute concentration of radioisotopes within small objects such as xenograft tumors and internal organs of mice or the like type of small animal, which may be a fraction of a cubic centimeter in size. This type of determination presents a challenge for traditional clinical PET systems whose intrinsic resolution is ~5 mm FWHM (full width half maximum) at best, resulting in severe blurring of small activity distributions and systematic errors in any direct measurements of concentration attempted from the PET image.

On the other hand, a clinical large-bore PET scanner, which has a bore of 50 cm or more and which is adapted for examination of adult humans, provides sufficient space to allow for the simultaneous scanning of several animals by virtue of its large field of view. In addition, its data acquisition properties are well understood, and its collimators provide an effective means of rejecting scatter and spurious gamma coincidences that are associated with the prompt gamma emissions of many long-lived PET radioisotopes.

It should be noted that throughout this disclosure the term "small animal" will be taken to mean, but not be specifically limited to, murine animals such as mice and other relatively small animals that are available for research purposes.

Figure 6:
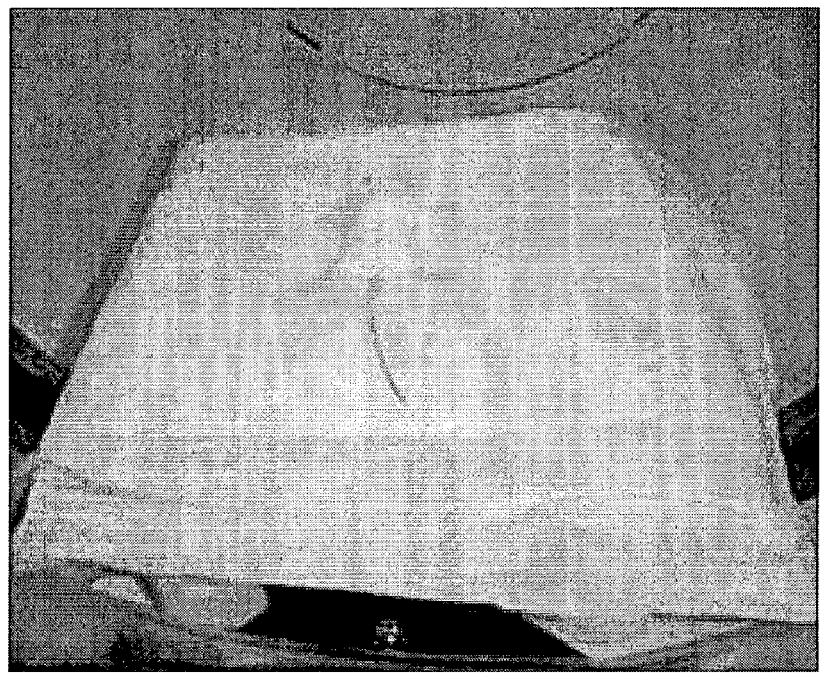
FIG. 6 is a perspective view of an anesthetized mouse disposed in a large bore PET scanner.
Figure 7:
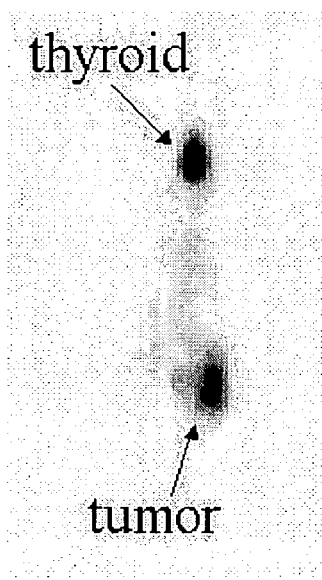
FIG. 7 is a 48 hr post-injection anti I124 antibody PET image of the mouse shown in FIG. 6.
Figure 9:
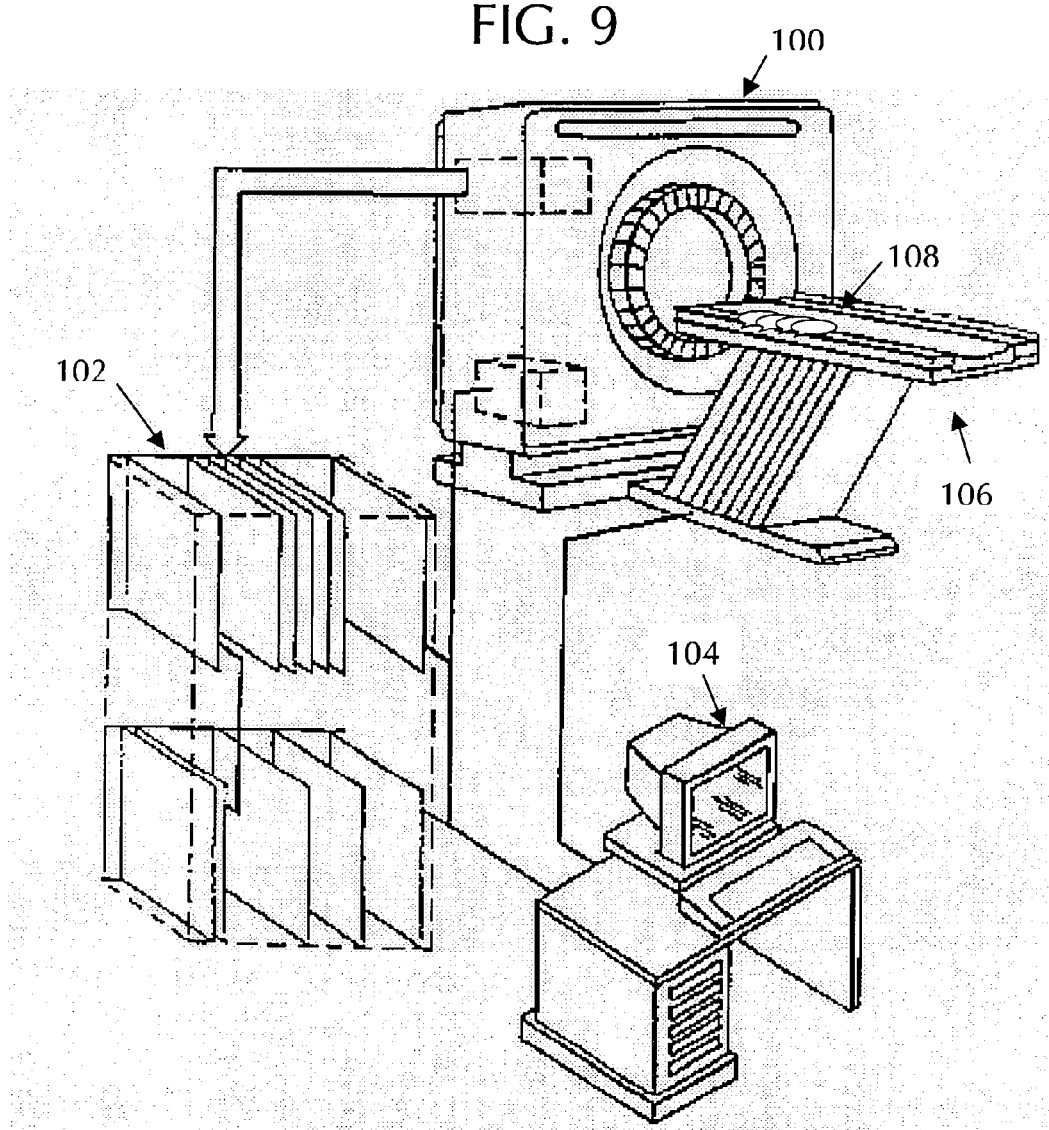
FIG. 9 is a perspective view showing a PET scanner and associated hardware including a memory in which the scan data can be stored along with the resulting process data which is implemented in accordance with the embodiments of the invention.

FIG. 9 schematically depicts a PET scanner 100 of the nature which can be used in accordance with the embodiments of the invention. This arrangement includes a memory 102 and a control console 104. The movable bed 106 may be used, in accordance with the embodiments of the invention to support a plurality of small animals (such as the mouse shown in FIG. 6), and is herein schematically depicted at 108. This scanner thus allows the simultaneous scanning of multiple animals and speeds up the examination throughput. This arrangement of course includes the software, firmware and hardware necessary to implement the mathematical processes exemplified by the following equations provided below.

In accordance with one embodiment of the present invention, in order to make accurate estimates of PET radionuclide activity and activity concentrations, it is necessary to properly account for the loss of positron-electron annihilation events. Accordingly, in accordance with a first embodiment, the (first) distribution of positron-electron annihilation events is modeled by a convolution of the distribution of positron-emitting radionuclides using an appropriate kernel. The resulting (second) distribution of annihilation events is masked by a three-dimensional map of the physical medium where the distribution of radionuclides is located. Thus, the annihilation events from a low-density medium (such as air) surrounding the distribution are suppressed.

The resulting (second) distribution is convolved once again with a kernel representative of the measurement system (i.e. PET scanner). Thus, a (third) distribution is obtained which takes into account the loss of positron-electron annihilation events.

Appropriate resolution recovery coefficients can be obtained by comparison of the first distribution of radionuclide with the third one which results from the convolution and masking operations—thus enabling the calculation of activity concentrations from in vivo data. The loss of positron events due to the finite size of the emission medium can also be estimated and used for correction of measured activities.

A distribution of PET radionuclide $\rho$ is assumed to exist within a certain material medium m which contains electrons on which positrons may annihilate to produce gamma rays and thus produce a detectable signal. Positrons will annihilate within a certain distance from their radionuclide of origin. This depends in a stochastic way on the energy of emission of the positron and the electron density of the surrounding medium.

The resulting distribution of annihilation events can be modeled by convolution with a kernel $K_{\beta^+}$.

$$\rho_{\beta^+} = K_{\beta^+} * \rho \tag{1}$$

In this particular example, the kernel used is a 3D Gaussian of the form $$K = A e^{-\frac{r_x^2}{2\sigma_x^2} - \frac{r_y^2}{2\sigma_y^2} - \frac{r_z^2}{2\sigma_z^2}} \tag{2}$$

In this instance the medium m consists in a homogeneous region of relatively high electron density (water-like) and a homogeneous region of relatively low electron density (air-like). A mask M is created which assigns values of 1 to the medium regions with high electron density and 0 to the regions of low electron density.

The mask is used as a factor on the annihilation distribution $\rho_{\beta^+}$ so that events that fall in the low-density region are suppressed, yielding the corrected annihilation distribution:

$$\rho_{\beta^+}' = M \cdot K_{\beta^+} * \rho \tag{3}$$

The corrected annihilation distribution is further convolved by the system point-spread function $K_{sys}$, which in this example is a 3D Gaussian, resulting in the simulation of the estimated activity distribution that would be measured by a PET system $$\rho' = K_{sys} M K_{\beta^+} * \rho \tag{4}$$

This estimated activity distribution can then be used to calculate activity concentration recovery coefficients in vivo in the manner described herein later. In addition, the true activity of assayed tissue may be corrected by dividing it by the recovery coefficient:

$$R_A = \frac{\sum \rho_{\beta^+}'}{\sum \rho} \tag{5}$$

which is calculated based on the volume of the tissue (numerator represents the summation of all annihilation events produced through the volume of the target object and surrounding material, and the denominator represents the summation of all disintegration events throughout the volume of the target) and a priori knowledge (which can be obtained by x-ray CT, for instance) of the material surrounding the target tissue sample.

A further refinement comprises the empirical (measured) recovery coefficients $R_e$ for distributions that are fully embedded in the attenuation medium. Then the calculated (by the previously described convolution procedure or some other method) recovery coefficients for fully embedded $R_s^c$ and partly embedded $R_p^c$ target distribution are calculated and their ratio obtained.

$$\Delta = \frac{R_p^c}{R_s^c} \tag{6}$$

and used as a correction factor on the empirical recovery coefficients in order to obtain a semi-empirical recovery coefficient for the semi-embedded target distribution.

$$R^{se} = \Delta \cdot R_e \tag{7}$$

This procedure has the advantage of applying a perturbative correction to an empirical (and presumably accurate) recovery coefficient value, and thus introducing less sensitivity to the model used for the correction.

EXAMPLE

Figure 8:
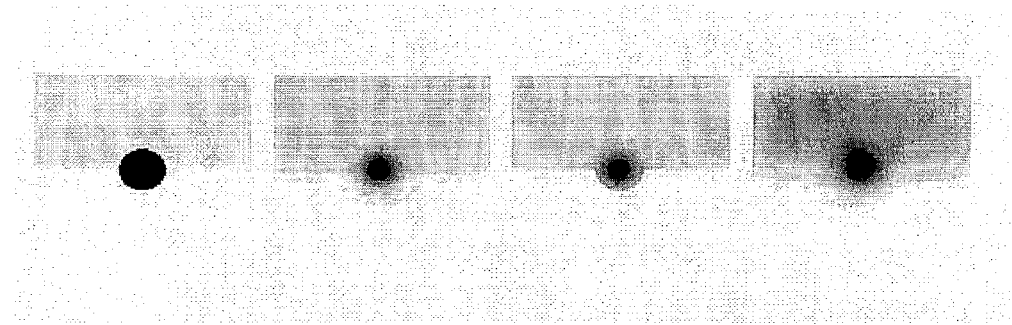
FIG. 8 shows from left to right: a simulated spherical distribution of activity which was convolved by a positron-range kernel, then masked by the medium with density above that of air, convolved again by a system kernel resulting in the estimated PET distribution taking into account the positrons loss in air.

FIG. 8 shows an example of a simulated spherical distribution of activity embedded in a background of activity which occupies only part of the space surrounding the spherical distribution. A prototype code written in Matlab was used in the generation of activity concentration recovery coefficients R and activity recovery coefficients $R_A$. These coefficients have been compared to experimental PET and scintillator counter data, and found to be in excellent agreement.

Recovery Coefficient

Experiments were conducted to provide a quantitative analysis of I-124 PET images on a GE Discovery LS system using a small-animal phantom to obtain recovery coefficients which were then applied to in vivo murine PET data.

The PET-obtained quantitation of tumor % injected dose/gram compared favorably with those obtained from a conventional biodistribution study done ex-vivo on the same mice.

Figure 1:
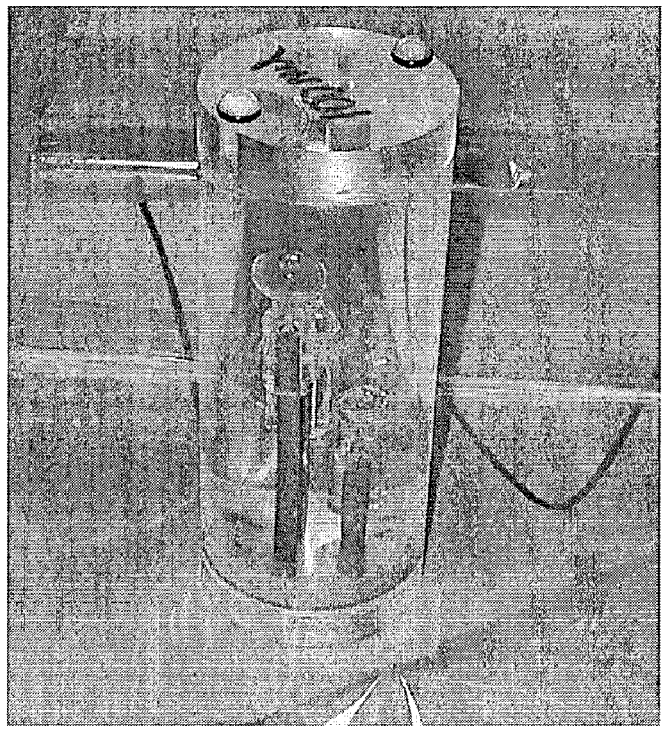
FIG. 1 is a perspective view showing a phantom which includes spherical inserts containing PET tracer material immersed in a predetermined medium and which was used in connection with the development of the correction processes which are applied in accordance with the embodiments of the invention.
Figure 2:
FIG. 2 is a coronal PET image derived using the phantom depicted in FIG. 1 with 1/20 background-to-target activity concentration ratios.
Figure 3:
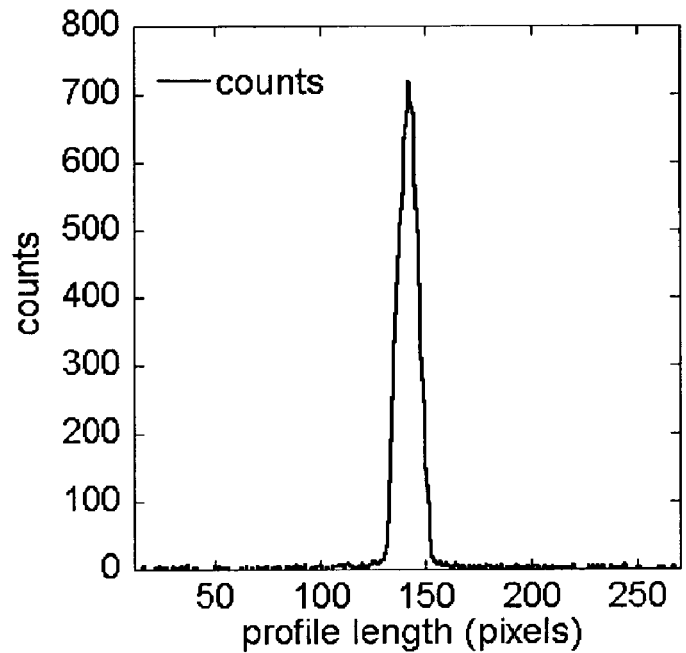
FIG. 3 is a graph showing a sinogram slice going through the phantom (1:10 background-to-target activity concentration) and wherein the modest contribution of scatter and prompt gamma events is evident by the small tails and low background counts outside of the physical boundaries of the phantom.
Figure 4:
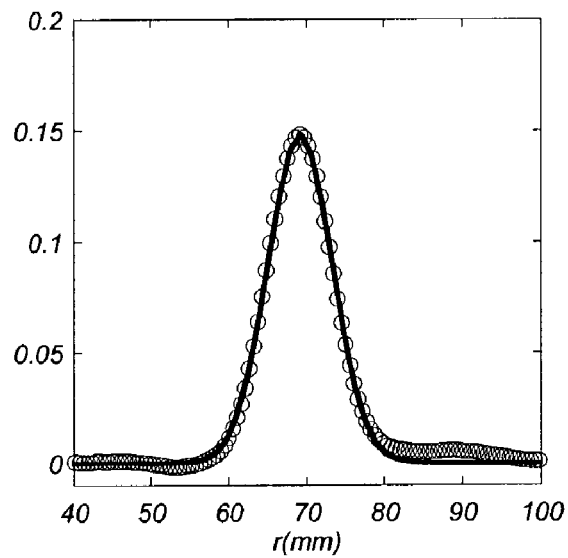
FIG. 4 is a graph showing profiles across an I-124 line source fitted by a Gaussian.
Figure 5A:
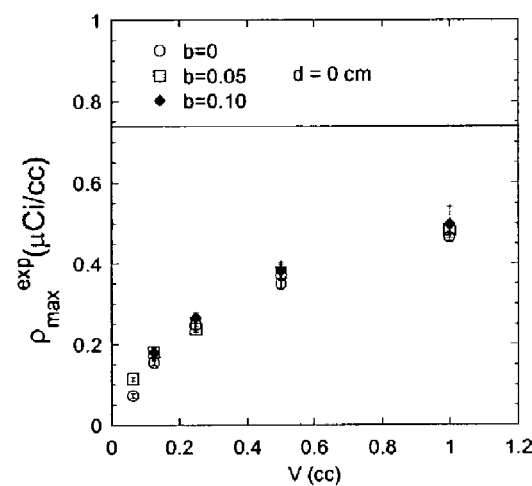
FIG. 5A–FIG. 5F are graphical plots which show maximum measured activity concentration and recovered activity concentration as a function of sphere volume for various background-to-target ratios and distances from the z-axis of the scanner. The horizontal line shows the ground-truth activity concentration in the spheres.
Figure 5B:
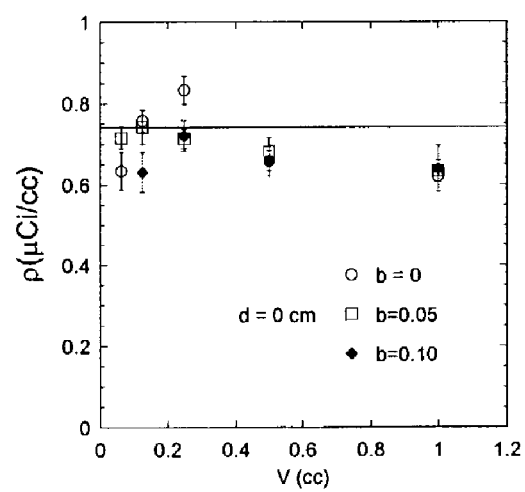
Figure 5C:
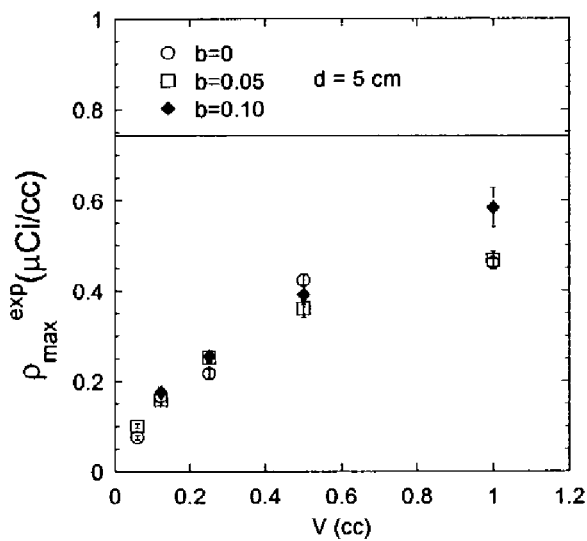
Figure 5D:
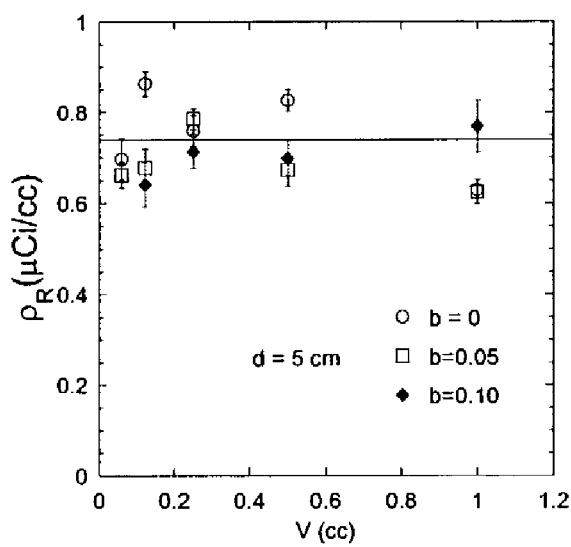
Figure 5E:
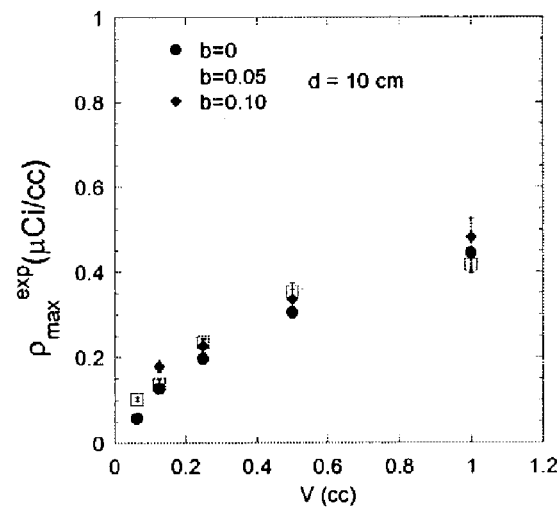
Figure 5F:
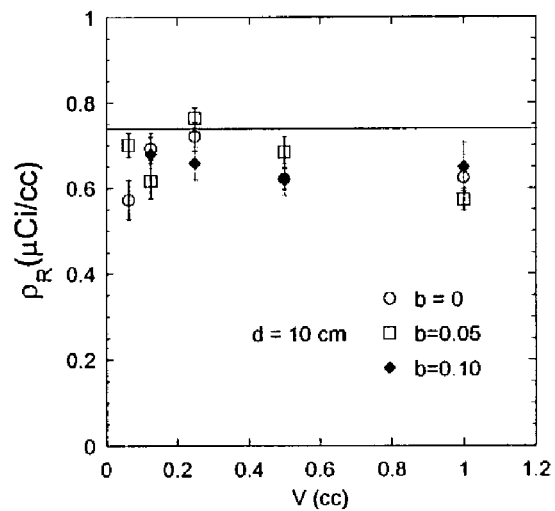

FIG. 1 shows the small-animal phantom which consisted of a 4×8 cm water-filled acrylic cylinder with hollow spheres also filled with water and ranging in volume from 0.0625 ml to 1.0 ml. The I-124 activity concentration in the spheres was 0.74±0.05 microCi/cc and the background activity concentrations were varied from 0 to 1/20 to 1/10 of the spheres. Data were acquired at 0 cm, 5 cm and 10 cm from the longitudinal axis of the scanner. FBP (filtered backprojection) images were reconstructed with a 2 mm FWHM Gaussian post-filter. The background activity concentration was estimated from regions of interest (ROIs) near the center of phantom and a few cm from the spheres. Recovery coefficients were calculated for spheres of different volume, sphere-to-background concentrations and distance from the scanner's longitudinal axis. The recovery coefficients were applied to the maximum sphere activity concentration measured from the PET images, thus obtaining a "recovered" activity concentration to be compared with the known activity concentration of the spheres.

Background activity concentrations were measured from the PET images with a bias of ~4% and a standard deviation of ~5%. For all the spheres the overall recovered activity concentration bias and standard deviation was -9% and 10%, respectively. I-124 diabody PET images of three mice with tumor xenografts were then analyzed using the techniques described above. Tumor percent injected dose per gram (% ID/g=(decay-corrected activity concentration in the tumor divided by the injected dose) estimated from the PET images (e.g. 0.379, 1.73, 4.77) were comparable to those obtained from biodistribution studies (i.e 0.362, 1.92, 5.13). The ability to perform quantitative imaging on murine I-124 antibody fragment PET images using a large-bore clinical scanner enables high-throughput studies to evaluate the performance of PET tracers in a timely and cost-effective manner by imaging multiple animals simultaneously.

More specifically, a PET image is a representation of a distribution of radionuclide based on the tomographic reconstruction from lines of response deduced from the detection of coincident photon events due to the annihilation of positrons with electrons. This representation is distorted in part by the count-limited nature of the data acquisition (e.g. the number of detected instances coincident annihilation events is limited) and by resolution-degradation effects; such as annihilation photon non-collinearity, detector response function and positron range. In the case of I-124, positron range plays a significant role in resolution degradation.

The image <ρ> (ignoring the contribution of noise, scatter, random and prompt gamma events) corresponding to a three-dimensional distribution of PET radionuclide ρ can be represented by $$\rho' = S * R_{I-124} * G_{F-18} * \rho \tag{6}$$

where $G_{F-18}$ is a 3D Gaussian kernel representing the image blur due to the F-18's annihilation photon non-collinearity, detector response function and positron range. $R_{I-124}$ is a 3D Gaussian kernel representing the additional degradation in resolution due to the positron range of I-124, S is the filter applied to the reconstructed image and voxel discretization, and * is the convolution operator.

Assuming a homogeneous, spherical activity distribution of known volume V surrounded by a background of known constant activity concentration, it is possible to calculate recovery coefficients R, in a manner similar to that disclosed in "Analysis of Emission Tomographic Scan Data: Limitations Imposed by Resolution and Background"—Robert M. Kessler, James R. Ellis, Jr., and Murry Eden Jou. Comp. Ass. Tomo 8(3): 514–522. This recovery coefficient is defined as:

$$R = \frac{\rho_{max}}{\rho'_{max}} \tag{7}$$

Recovery coefficients were calculated using Equation (7) for simulated spherical activity distributions with volumes, background-to-target ratios and distances from the scanner's z-axis equal to those of the phantom measurements. The simulated distributions were then convolved with Gaussian PSFs according to Equation (3). The measured (experimental) maximum activity concentrations $\rho_{max}^{exp}$ in the I-124 phantom spheres were multiplied by the appropriate recovery coefficient R to obtain the recovered activity concentration $\rho_R$. The recovered activity concentrations were then compared to the true activity concentration in the phantom spheres $\rho_{true}$=0.74±0.05 μCi/cc.

The overall recovered concentration bias was estimated as the mean percent difference for all recovered activity concentrations measured. In these equations d is the distance of the target from the z-axis of the scanner, V is the volume of the target, b is the target-to-background ratio.

$$\%\overline{\Delta} = \frac{1}{N_d N_V N_b} \sum_d \sum_V \sum_b \%\Delta(d, V, b) \tag{8}$$

where:

$$\%\Delta(d, V, b) = 100 \frac{\rho_R(d, V, b) - \rho_{true}}{\rho_{true}} \tag{9}$$

The standard deviation from the percent differences from each individual sphere measurement was given by:

$$\%\Delta_s = \left( \frac{1}{N_d N_V N_b - 1} \cdot \sum_d \sum_V \sum_b (\%\Delta(d, V, b) - \%\overline{\Delta})^2 \right)^{\frac{1}{2}} \tag{10}$$

Thus, having derived the necessary correction coefficients it is possible to implement the accuracy improving method outlined above and thus derive results which can be confirmed using necropsy studies.

In connection with the aspects of the invention that involve the use of PET scanners, it will be noted that due to the space available in a large bore clinical PET scanner it is possible to simultaneously scan and derive accurate assay results for a plurality of small animals. This of course is highly beneficial in the development of new drugs/treatments in that the throughput of the number of animals and the very rapid rate at which the results can be complied and made available to investigators is invaluable.

The rapid throughput is facilitated in that the assays are carried out in vivo and allow the same animals to be rescanned at different times and thus reduce the amount of "noise" which introduced by the use of a different animal for each period of exposure demanded by the study.

It will, however, be understood that while the invention has been described with reference to only a limited number of embodiments, the invention, which is limited only by the appended claims. Various changes and modifications can be made without departing from the scope thereof.

That is to say, the corrective processes which are described above can be applied to research related to the application of any suitable labeling tracer and used to assay the concentration of the tracer within a small volume such as organs/tissues. These organs and tissue are not limited to in vivo investigations using mice or other small animals and may be applied to small amounts of biopsy tissue or the like which has been removed from a human patient and which contain substances which have been labeled with a PET tracer.

More specifically, the corrective processes which have been described above can be used in assays wherein the positron-electron annihilations are detected using a counter or similar sensing arrangement and the concentration of tracer determined by correcting the detected count.

What is claimed is:

1. A method of accounting for loss of positron-electron annihilation events and quantitative inaccuracies in PET (positron emission tomography) imaging, comprising:
   modeling a distribution of positron-electron annihilation events by:
   convolving a first distribution of positron-emitting radionuclides using a first predetermined kernel to produce a second distribution result;
   masking the second distribution result with a three-dimensional map of a physical medium where the distribution of radionuclides is located so as to suppress annihilation events from a low-density medium and producing a third distribution result; and
   convolving the third distribution result with a kernel representative of the measurement system to produce a fourth distribution result which takes into account the loss of positron-electron annihilation events.

2. A method as set forth in claim 1, further comprising obtaining resolution recovery coefficients by comparing the first distribution of radionuclide with the third distribution result.

3. A method as set forth in claim 1, further comprising estimating a loss of positron-electron annihilation events due to a unite size of the physical medium and correcting measured activities using the estimated lost.

4. A method as set forth in claim 1, wherein the PET imaging comprises in vivo small body PET imaging and biodistribution study.

5. A method as set forth in claim 4, wherein the small body comprises a small animal.

6. A method as set forth in claim 4, wherein the small animal is a murine animal.

* * * * *